United States Patent [19]
Rao et al.

[11] Patent Number: 4,544,388
[45] Date of Patent: Oct. 1, 1985

[54] APPARATUS FOR PERIODICALLY OXIDIZING PARTICULATES COLLECTED FROM EXHAUST GASES

[75] Inventors: Vemulapalli D. N. Rao, Bloomfield Township, Oakland County; Wallace R. Wade, Farmington Hills, both of Mich.

[73] Assignee: Ford Motor Company, Dearborn, Mich.

[21] Appl. No.: 573,277

[22] Filed: Dec. 27, 1983

[51] Int. Cl.[4] .................... B01D 39/20; B01D 46/42; F01N 3/02; F01N 3/10

[52] U.S. Cl. ........................................ 55/282; 55/272; 55/283; 55/288; 55/314; 55/DIG. 10; 55/DIG. 30; 422/178; 60/303; 60/311; 60/320

[58] Field of Search .................. 55/272, 282, 283, 288, 55/312, 314, 466, 523, DIG. 10, DIG. 30; 422/174, 176, 178; 60/287, 288, 295, 299, 300, 303, 311, 320

[56] References Cited

U.S. PATENT DOCUMENTS

| | | | |
|---|---|---|---|
| 2,898,202 | 8/1959 | Houdry et al. | 60/295 |
| 3,719,457 | 3/1973 | Nagamatsu | 422/176 |
| 3,779,015 | 12/1973 | Maruora | 60/300 |
| 3,852,042 | 12/1974 | Wagner | 60/299 |
| 4,322,387 | 3/1982 | Virk et al. | 55/282 |
| 4,383,411 | 5/1983 | Riddel | 60/303 |
| 4,404,795 | 9/1983 | Oishi et al. | 60/303 |
| 4,416,674 | 11/1983 | McMahon et al. | 55/485 |

Primary Examiner—David L. Lacey
Attorney, Agent, or Firm—Joseph W. Malleck; Roger L. May

[57] ABSTRACT

An apparatus is disclosed for regenerating a filter trap used to collect particulates from the exhaust gas of an internal combustion engine. The apparatus comprises: (a) an assembly providing a flow of a heat transfer medium through the filter trap: (b) an assembly for heating the heat transfer medium to a temperature effective to incinerate the particulates in the filter trap: and (c) a flow mask stationed in the flow of heat transfer medium, upstream from said filter trap, effective to divert the heat transfer medium away from the radially inner zone of the filter trap while guiding the heat transfer medium to engage and ignite the particulates along a radially outer region of the filter trap. The mask is a circular disc and spaced upstream from the filter trap effective to mask a central core area of the flow of heat transfer medium.

The assembly for heating comprises one or more electrically heated resistance elements arranged in a planar coil configuration extending transversely across the flow of heat transfer medium. A flow diffuser is stationed upstream from the mask and is comprised of a plurality of foraminous plates effective to diffuse and slow down the flow of heat transfer medium for increasing heat exchange. The flow diffuser has a radiation reflective coating to limit heat losses and a member is employed for depressing the temperature required to ignite the particulates.

14 Claims, 6 Drawing Figures

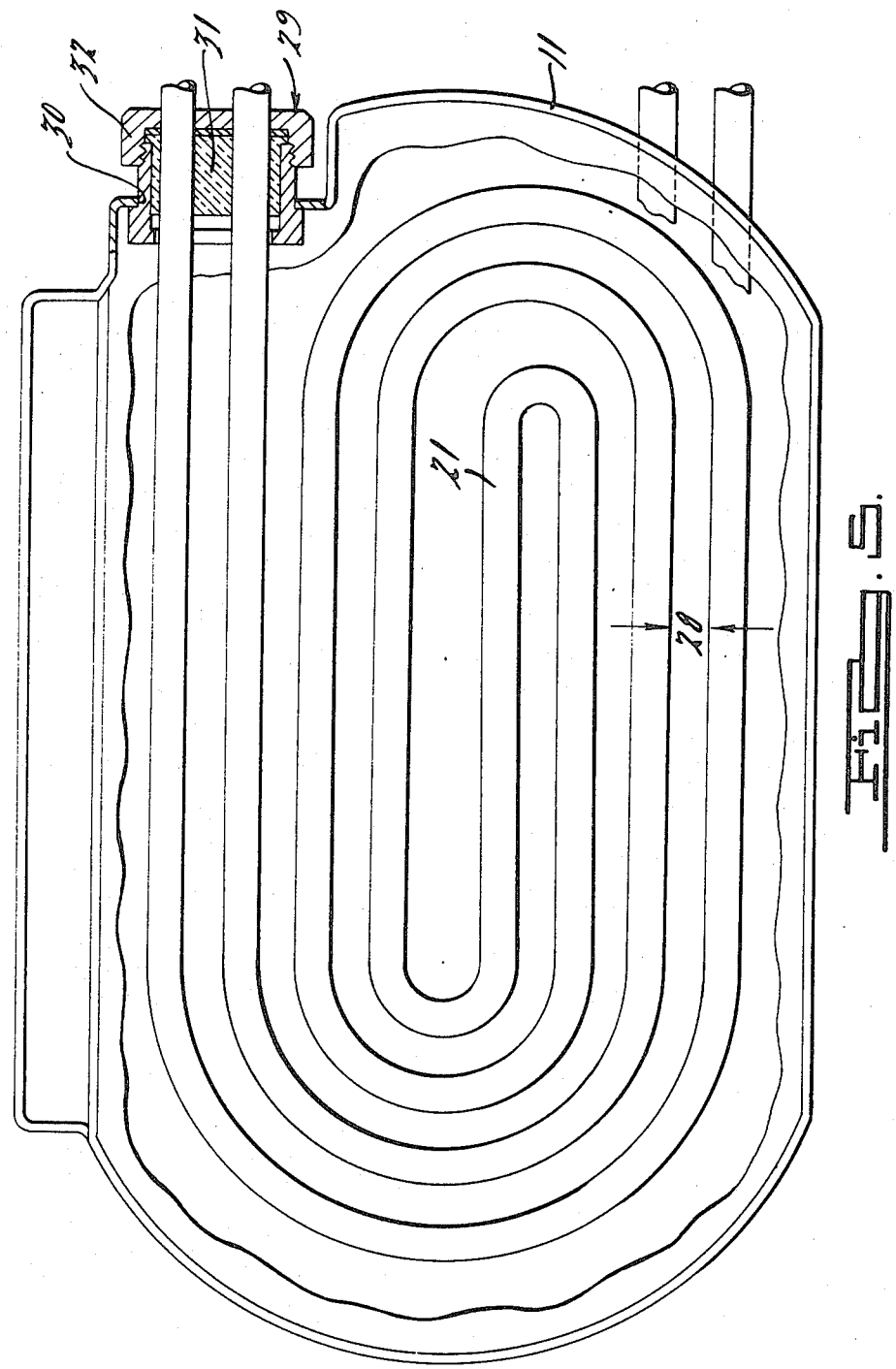

APPARATUS FOR PERIODICALLY OXIDIZING PARTICULATES COLLECTED FROM EXHAUST GASES

TECHNICAL FIELD

The invention relates to the technology of regenerating a particulate trap used to remove particulates from the exhaust gases of an automotive internal combustion engine and, more particularly, to apparatus for more effectively heating the particulates using an electrical heating assembly. This application is an improvement related to U.S. application Ser. No. 598,552, by the same inventors, directed to apparatus that permits electrically energized regeneration to take place with less electrical energy input.

BACKGROUND OF THE INVENTION AND PRIOR ART STATEMENT

Particulate emissions from an engine can be reduced with a particulate filter trap and a regeneration system to periodically clean the filter trap of particulates by incineration. Generally, durable and acceptable filters for particulate traps have been developed by the art which have included wire mesh (see U.S. Pat. No. 3,499,269) and, more advantageously, rigid ceramics preferably in a honeycomb monolithic cellular wall structure (see U.S. Pat. Nos. 4,276,071; 4,329,162; and 4,340,403).

Systems of regeneration, developed by the state of the art using filters, may now be categorized as: (a) electrical heating, (b) hydrocarbon fuel fed burners, (c) catalyst impregnated traps, and (d) engine throttling. Each of the regeneration systems rely upon a heated gas to ignite the collection of particulates within the trap. The heated gas can be (1) the exhaust gas raised in temperature by high engine throttling or hydrocarbon fuel augmentation, or (2) an independent air flow raised to a high temperature by electrical heaters or fuel fed burners.

One of the problems common to all of the above regeneration systems, and associated with the use of a heated gas to ignite particulates, is the temperature gradient created in the filter trap as the result of burning of the particulate collection. As burning proceeds along the length of the filter trap, the exothermic reaction creates a continuously increasing temperature at the central core of the filter while the outer radial region of the filter trap maintains a lower temperature due to a temperature loss from radiation and conduction through the filter trap housing. It is possible to reach core temperatures that result in some destruction of the cellular or mesh filter structure.

Regeneration by electrical heating appears to be most advantageous because it offers promise of reliability and simplicity. It can be carried out under any vehicle operating condition with a minimum increase in fuel economy and without affecting emission content at the outlet of the automotive exhaust system (see use by prior art in U.S. Pat. No. 4,270,936; 4,276,066; and 4,319,896). However, these electrical regeneration systems of the prior art rely upon an unmodified flow of exhaust gas to act as the heat transfer medium between the heater elements and the particulates. The flow creates too large a mass to be quickly heated by the elements without use of oversized heating elements and without detrimental loss of energy through radiation. The heated exhaust gas intersects the filter trap in such a manner to often create detrimental temperature gradients. As a result, electrical power consumption is high and inefficient.

What is needed is a regeneration system for an automotive filter trap that has an electrical heating assembly which (a) avoids destructive temperature gradients in the filter trap during regeneration, and (b) achieves quicker regeneration through electrical means with less energy losses.

SUMMARY OF THE INVENTION

The invention is an apparatus for regenerating a filter trap used to collect particulates from the exhaust gas of an internal combustion engine. The apparatus comprises: (a) means providing a flow of an oxygen carrying heat transfer medium through the filter trap laden with particulates; (b) means for heating the heat transfer medium to a temperature effective to ignite the particulates in the filter trap; and (c) a flow mask stationed in the flow of heat transfer medium, upstream from said filter trap, effective to divert the heat transfer medium away from the radially inner zone of the filter trap while guiding the heat transfer medium to engage and ignite the particulates along a radially outer region of the filter trap. Preferably, the mask is a circular disc and spaced upstream from the filter trap a distance of about 0.5–1.5 inches and effective to mask about 30–45% of the flow of heat transfer medium at the radially inner zone.

To improve the effectiveness of the means for heating the heat transfer medium, an improved electrical resistance element configuration and orientation may be preferably employed. This is obtained by arranging the electrical resistant elements in one or more planar coil configurations, the planes of the coils extending transversely across the flow of the heat transfer medium, optimally with no spacing between the resistance elements, in the radially outer region of the configuration, being greater than 0.5–0.75 inches. The improved heat transfer is also achieved by additionally employing a flow diffuser and/or radiation reflector. The diffuser and/or reflector may advantageously be comprised of foraminous plates arranged in series with the openings of adjacent plates nonaligned with respect to the direction of flow, causing the flow of heat transfer medium to follow a devious course in permeating the plates. The plates are effective to promote slower and more diffused flow of the heat transfer medium as the flow engages the electrical resistance elements, thereby promoting more effective heat transfer. The diffuser may additionally be comprised of a coating providing for heat or radiation reflection, thereby limiting energy losses from the heating means in a direction aligned with the flow. Lastly, the means for heating the heat transfer medium may additionally comprise a member for depressing the temperature required to ignite the particulate collection. Preferably, such member may comprise a catalyzed wire mesh located adjacent the front face of the particulate collection in the filter, whereby the presence of the catalytic material at such location induces a lower ignition temperature of the particulates.

SUMMARY OF THE DRAWINGS

FIG. 2a is a greatly enlarged portion of a part of the apparatus shown in FIG. 2;

FIG. 5 is a view taken substantially along line 5—5 of FIG. 1 illustrating the planar configuration orientation of the resistance heating elements.

BEST MODE FOR CARRYING OUT THE INVENTION

The regeneration system utilizes an electric heating assembly that heats a flow of air passing therethrough, which heated air in turn ignites the front face of the particulate collection in the filter trap. The air flow is slowed, diffused, and is masked by means stationed in the radially inner zone of the flow; the flow is guided to engage resistance elements concentrated more heavily in the radially outer zone and to ignite the radially outer zone of the particulate collection. Ignition temperature depressing means is stationed adjacent the particulate collection in the filter trap to further facilitate ease of oxidation. Ignition at the radially outer zone promotes a more uniform temperature gradient across and throughout the particulate collection as it is oxidized.

Figure 1:
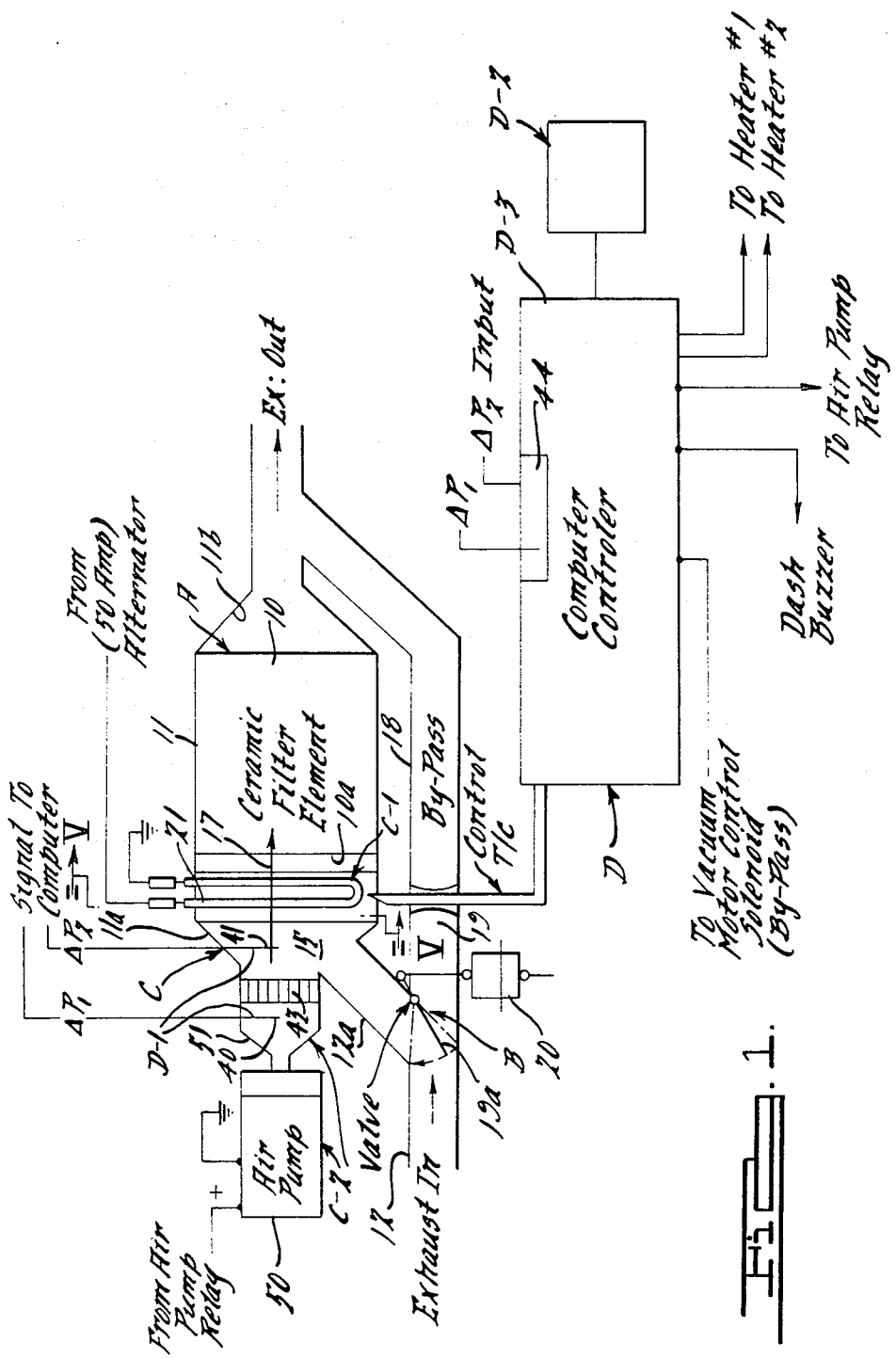
FIG. 1 is a schematic diagram of an automotive filter trap and regeneration system embodying the principles of this invention.

As shown in FIG. 1, an apparatus for regenerating a filter trap A, used to collect particulates from the exhaust gas of an internal combustion engine, comprises essentially an exhaust flow diverting means B, a heating means C which has a heating element assembly C-1 and a means for providing a heat transfer medium C-2, and control means D which includes an initiator D-1, electrical power source D-2, and an electronic control box and timer D-3.

Filter Trap

Figure 2:
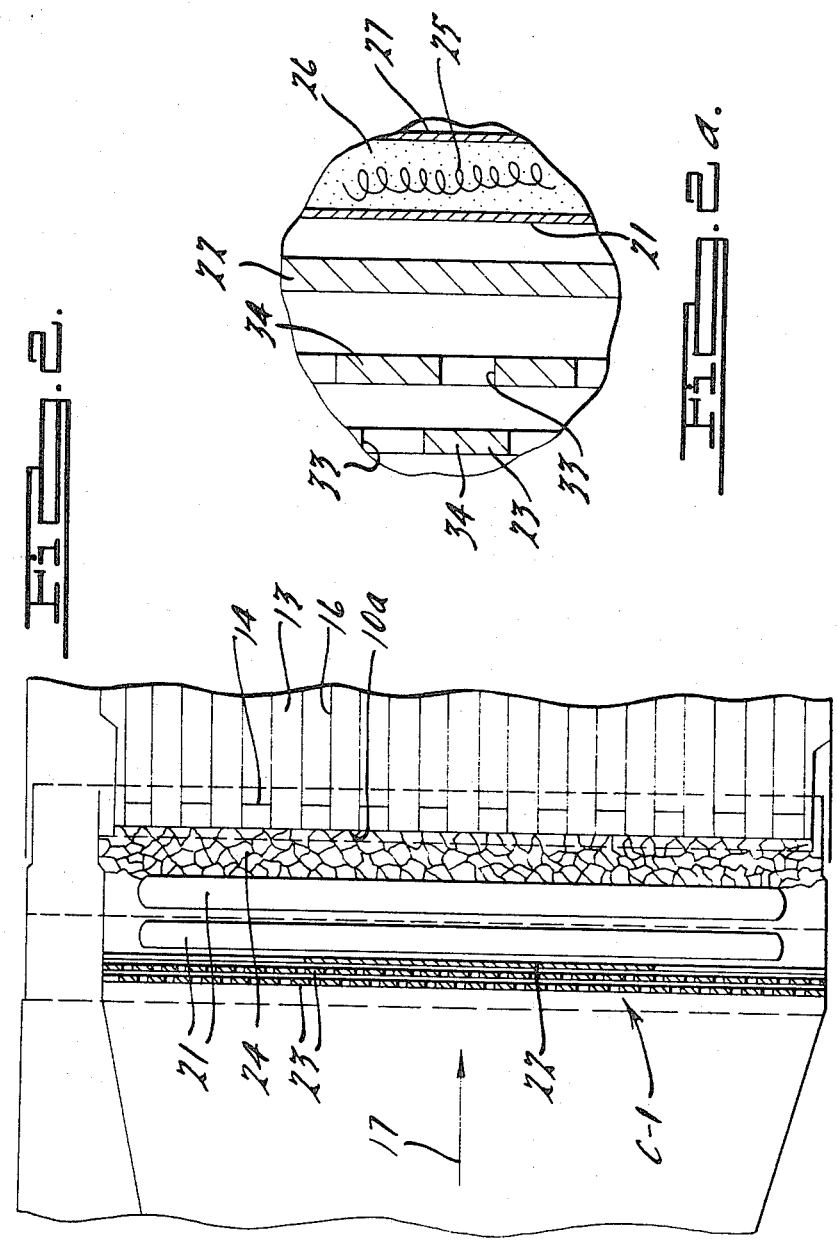
FIG. 2 is an enlarged central sectional view of a leading portion of the filter trap and the heating means employed to heat the heat transfer medium conveyed through the filter trap.

The filter trap A has a monolithic ceramic honeycomb cell structure 10 supported and contained in a metallic housing 11, the front portion of the housing 11a guiding the flow of exhaust gases from channel 12 (through channel 12a to the front face 10a of the monolith). The monolithic ceramic honeycomb cell structure may be similar to that used for carrying a catalyst material for conversion of gases from a gasoline engine. The monolithic structure contains parallel aligned channels 13 (as shown in FIG. 2) constituting the honeycomb cell structure. The ends of the channels are alternately blocked with high temperature ceramic cement at the front 14 and the rear so that all of the inlet flow gas must pass through the porous side walls 16 of the channels 13 before exiting through a rear opened channel of the filter trap. This type of monolithic ceramic structure provides very high filtration surface area per unit of volume. For example, a 119 cubic inch filter trap of this type with 100 cells per square inch and 0.017 inch wall thickness will provide approximately 1970 square inches of filtering surface area, and the filtering surface area per unit volume for such a filter trap would be about 16.6 square inches per cubic inch. The channels are all preferably aligned with the direction of the flow 17 through the trap. When the particulates collect on the trap they will nest within the porosity of the walls which are spaced along the direction of flow. Thus, there can be a generally uniform distribution of particulates collected along the length of the trap. Preferably the monolithic structure has an oval cross-section with a large frontal face 10a of 24–33 square inches, the axes of the oval preferably have a dimension of 4–5 inches and 7–8 inches, respectively.

Exhaust Flow Diverting Means

As shown in FIG. 1, the exhaust flow diverting means B comprises a bypass channel 18 defined here as a conduit effective to carry the exhaust gases around the filter trap A. The exhaust flow in channel 12 is diverted from communicating with the frontal interior 15 of the filter trap housing by a diverter valve assembly 19, the diverter valve may be a flapper type valve 19a actuated by a vacuum motor control 20 to move the valve from a normally biased position, closing off communication with the bypass channel 18, to an actuated position where the valve closes off communication with the frontal interior 15 of the filter trap housing. The vacuum motor 20 is electrically actuated under the control of control means D.

Heating Means

As shown in FIG. 2, the heating element assembly C-1 comprises essentially one or more electrical resistance elements 21, a flow mask 22 upstream from the resistance elements, a diffuser and/or reflector 23 upstream from the mask, and an ignition temperature depressing means 24 stationed adjacent the frontal face 10a of the filter trap.

The electrical resistance elements 21 preferably comprise sheathed nickel chromium wire elements 25, the resistance elements being encased within magnesium oxide powder 26 contained by the sheath 27. The elements are sized to have a resistance heating capacity sufficient to raise the temperature of a low flow of heat transfer medium to a temperature of about 1100° F. within a period of 1.5–3.5 minutes. The heating element surface temperature should usually reach 1400° F. to bring this about. The elements are characterized by the ability to heat with an electrical input to the resistance elements of 800–1750 watts, a current supply of 20–80 volts, and each element has a resistance of about 2.4 ohms.

Each of the electrical resistance elements may be preferably configured as a spiral, contained in a common plane extending transversely across the direction of flow of the heat transfer medium, as shown in FIG. 5. The spacing 28 between the flattened sheathed heating coils is preferably no greater than 0.5–0.75 inches in the radially outer region of the configuration. The configured heating elements are supported in a secure position by ceramic holding sleeve assembly 29 received in an opening 30 in the metallic housing wall 11; the assembly has a ceramic sleeve 31 contained in a split ceramic felt casing 32 bearing against the metallic housing wall 11.

The flow mask 22 is preferably comprised of a flat metallic disc of heat resistant alloy such as Inconel 600 (a trademark of International Nickel Company) or 304 stainless steel. The disc should have a thickness of 0.025–0.06 inches, sufficient to resist deflection within the type of flow to be experienced, and should be stationed upstream from the heating elements a distance (about 0.5–1.5 inches) sufficient to be capable of controlling the flow of heat transfer medium. The function of the mask is to divert the heat transfer medium away from such radially inner zone of the filter trap while guiding the heat transfer medium to engage and ignite the collection of particulates along a radially outer region of the filter trap.

Figure 4:
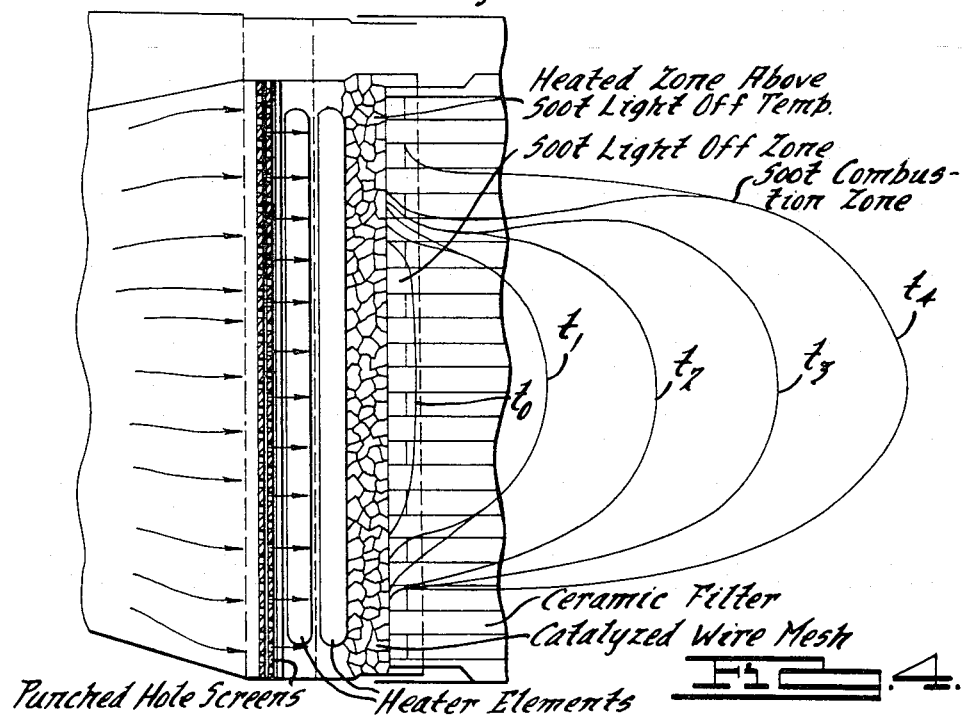
FIG. 4 is a view similar to FIG. 3 illustrating a progressive temperature gradient that is developed as a result of the absence of a mask.

Without the use of such a mask, a heat transfer medium heated to an incineration temperature to ignite the frontal face of the particulate collection will promote a temperature gradient in the filter trap, as shown in FIG. 4. As the burning proceeds along the length of the particulate collection device within the filter trap, the exothermic reaction creates a continuously increasing temperature gradient at the central core of the filter while the outer radial regions of the filter trap would retain a lower temperature. Under these conditions it is possible to reach core temperatures that result in destruction of the cellular or mesh filter structure.

Figure 3:
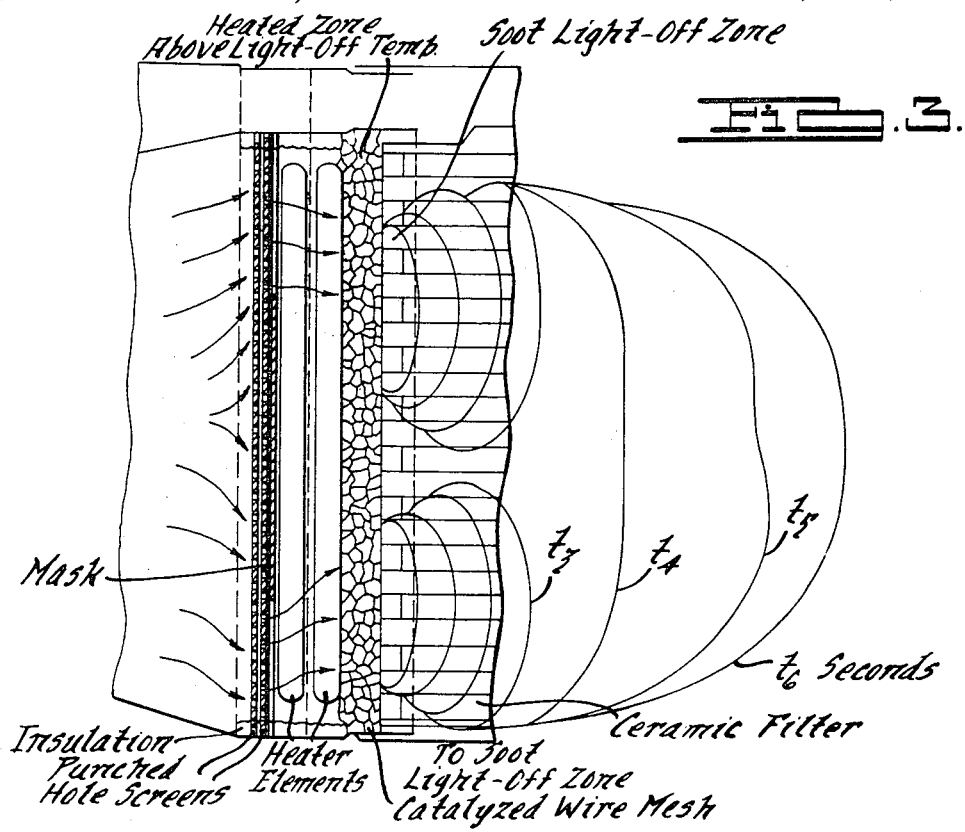
FIG. 3 is a view similar to that of FIG. 2 illustrating the progressive temperature gradient that is developed as a result of the use of the mask forming part of this invention.

With the use of the mask (see FIG. 3), the heat transfer medium engages the front face of the particulate collection device along a toroid or ring at the radially outer region of the particulate collection. The disc has a surface area effective to mask about 30-45% of the flow of the heat transfer medium at the radially inner zone. The ignited toroidal portion of the particulate collection then progressively proceeds both radially inwardly as well as along the length of the particulate collection device, allowing the temperature gradient to be more uniform across the entire section of the filter trap and thereby avoiding extremely high and unwanted core temperatures.

The diffuser 23 is a series of foraminous plates arranged in close spaced relationship immediately upstream of the mask, such spacing being in the range of 0.15-0.5 inches. The foraminous plates have a plurality of openings 33 therein, usually of the diameter of about 0.065-0.125 inches, and spaced apart about 0.08-0.16 inch, facilitating an open flow area in each plate of about 30-60%. The plates are arranged so that the openings provide no line of sight aligned with the direction of flow 17. This requires that the openings be offset with respect to the openings of an adjacent plate. In this manner, the flow is forced to be diverted and diffused, requiring a slowing down and promotion of greater heat transfer during engagement of the flow with the heating elements.

The plates of the diffuser may perform an additional function, reflection of the radiant heat of the heating elements. Such radiation may escape in a direction aligned with the flow. The plates are coated at side 34 with a material comprised of a thin layer of zirconia (0.002 inch thick), the material being sufficient to reflect radiation and function under the environment of the regeneration system.

The ignition temperature depressing means 24 may preferably comprise a catalyzed wire mesh formed into a blanket extending transversely across the flow 17 of heat transfer medium and is stationed immediately adjacent and in front of the particulate collection of the filter trap. The wire mesh may be a woven material having a strand thickness of about 3-5 mils and the catalyst coating preferably should be of a low sulphate active catalyst material such as gamma $Al_2O_3CeO_2$ wash with $Pt^2Rh$ precious metal impregnated in it. Alternatively, the surface of the wire mesh, woven from 3-5 mil diameter Inconel 600 alloy wire, is oxidized by exposing to 1600°-1800° F. for 10 minutes in still air and dipped in a solution of platinic chloride. The mesh is then heated to 1100° F. to decompose the platinic chloride to the oxide of platinum which becomes an active catalyst. This treatment eliminates the need for the gamma $Al_2O_3CeO_2$ washcoat for supporting the catalyst.

The presence of the catalytic material carried on the wire mesh operates to induce a lower ignition temperature of the particulates at the filter face. The catalyzed wire mesh must provide an open flow area greater than 70% to enable the heat transfer medium to flow relatively unimpeded therethrough. The catalyzed wire mesh also functions to collect hydrocarbon soot during the exhaust gas filtration cycle, which soot acts as a match to ignite the particulates in the filter trap.

The Control Means D

The initiator D-1 of the electrical control means D is comprised of two pressure sensor/transducers 40 and 41, sensor/transducer 41 being located to sense the back pressure immediately upstream of the front of the filter trap, which pressure corrolates with the degree of particulate collection in the filter or contamination thereof. The other sensor/transducer 40 is placed in an open channel ceramic honeycomb structure 43 located considerably upstream from the filter itself. The open channel structure 43 contains a porosity which is much larger than the filter trap itself so that none of the particulates will become entrapped within the open channel honeycomb ceramic. The pressure sensor 40 of the pressure/transducer is located in the honeycomb structure to sense the pressure, simulating a clean filter trap. The sensor/transducers 40 and 41 are each of a capacitance type with a measurable voltage output that is a function of the sensed back pressure. The voltage output is conveyed to an electronic comparator device 44 contained within the control box D-3. The two voltage signals are ratioed in the comparator device 44; when the ratio exceeds a predetermined set maximum, an electrical signal is then relayed within the control to initiate the entire regeneration or oxidizing cycle.

Monitoring the reference pressure drop across the open channel ceramic honeycomb structure 43 will always provide a signal proportional to the clean trap pressure drop for the instantaneous exhaust flow rate. Dividing the actual trap pressure drop by a constant, multiplied by the reference pressure drop, will provide an electrical signal proportional to the trap loading and which is independent of engine speed, engine load, and exhaust temperature. Thus, when the trap loading is greater than the allowable limit, an electrical signal will be provided to start the oxidizing or regeneration process. The limit may be set at a ratio of the dirty trap voltage to the clean trap voltage of about 3:1 to 8:1.

The electric power source D-2 may be comprised of an automotive battery or, preferably, an unregulated electrical supply from an alternator driven by the engine of the automobile carrying the system.

The electronic control box and timer receives the signal from the comparator device 44 to actuate several timed electrical events in sequence. The timed events include: (1) actuating the vacuum motor 20 to operate the bypass valve substantially simultaneously with the closing of a circuit to energize the heating elements; (2) closing a circuit to energize air pump motor 50 to transmit a supply of air through conduit 51 to the frontal interior space 15 of the filter trap when the heating element has attained a surface temperature of 1100° F. (the actuation of the air pump motor typically will occur at approximately 2.5 minutes of elapsed time after heater element energization); (3) interrupting the supply of electrical current to the heating means after about half of the total oxidizing cycle time has elapsed; and (4) cessation of the blower means and deactivation of the diverter valve at either a stable self-sustained oxidation condition in the filter trap or at the completion of the full oxidizing cycle time.

We claim:

1. An apparatus for regenerating a filter trap used to collect particulates from the exhaust gas of an internal combustion engine, comprising:
   (a) first means for providing a flow of an oxygen carrying heat transfer medium to and through a filter trap containing particulates;
   (b) second means for heating the heat transfer medium in said first means to a temperature effective to ignite at least one portion of said particulates to permit incineration of the remainder of said particulates; and
   (c) a flow mask stationed in said first means so as to provide a flow of heat transfer medium to a filter trap downstream from said means for heating the heat transfer medium, said mask being constructed and arranged such as to divert the heated heat transfer medium away from the radially inner zone of such filter trap and thereby guide said heated heat transfer medium to engage and ignite particulates along a radially outer zone of the filter trap.

2. The apparatus as in claim 1, in which said flow mask is comprised of circular disc which has a surface area effective to mask about 30–45% of the means providing a flow of heat transfer medium at the radially inner zone.

3. The apparatus as in claim 1, in which said means for heating the heat transfer medium comprises resistance elements arranged in one or more planar coil configurations, said planes for the coils extending transversely across the means providing a flow of said heat transfer medium, the spacing between said coils in the radially outer region of said flow being no greater than 0.5–0.75 inches.

4. The apparatus as in claim 1, in which said means for heating said heat transfer medium comprises a flow diffuser effective to promote a slower, more diffused flow in said means providing a flow of said heat transfer medium.

5. The apparatus as in claim 4, in which said flow diffuser is comprised of a plurality of foraminous plates extending transversely across said means providing a flow of heat transfer medium and being spaced from each other a distance within the range of 0.15–0.50 inches.

6. The apparatus as in claim 5, in which said foraminous plates have the openings of adjacent plates nonaligned with respect to a longitudinal axis of said means providing a flow of heat transfer medium, causing said flow of heat transfer medium to follow a devious course in permeating said plates.

7. The apparatus as in claim 4, in which said flow diffuser additionally has a coating of radiation reflective material to limit the radiation heating loss from the heating means.

8. The apparatus as in claim 1, in which said heating means additionally comprises an ignition temperature depressing member for lowering the ignition temperature of said particulates.

9. The apparatus as in claim 8, in which said ignition temperature depressing member comprises a catalytically coated wire mesh.

10. A combination filter trap and filter trap regenerating apparatus comprising:
    (a) a filter trap for collecting particulates from the exhaust gas of an internal combustion engine;
    (b) first means providing a flow of a heat transfer medium through the filter trap so as to remove particulates from said filter trap;
    (c) one or more electrical resistance heating elements in said first means extending transversely there across for raising the temperature of said medium to an ignition temperature for igniting said particulate collection; and
    (d) means in said first means to control the flow of said heat transfer medium and to provide a diffused toroidal flow of said medium for engaging said particulate collection.

11. The combination as in claim 10, in which said means to control the flow is constructed in a manner to diffuse said flow to a rate of less than 6 cubic feet per minute.

12. The combination as in claim 10, in which said means for controlling the flow of said heat transfer medium comprises a mask stationed to block off the flow of said heat transfer medium through a radially inner zone of said flow while guiding the medium to engage and ignite the particulate collection along a radially outer region of the filter trap.

13. The combination as in claim 10, in which said means to control the flow of heat transfer medium comprises a flow diffuser constructed to promote diffused flow of said heat transfer medium prior to traversing said one or more resistant elements.

14. The combination as in claim 13, in which said diffuser is comprised of a series of foraminuous plates each spaced apart a distance in the range of 0.15–0.50 inches and having the openings therein nonaligned to promote diffused flow.

* * * * *